United States Patent
Hamerski

[11] Patent Number: 6,106,937
[45] Date of Patent: *Aug. 22, 2000

[54] STRETCH RELEASE ADHESIVE ARTICLE WITH ENHANCED REMOVAL FEATURE

[75] Inventor: Michael D. Hamerski, Baldwin Township, Wis.

[73] Assignee: 3M Innovative Properties Company, St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/092,630

[22] Filed: Jun. 5, 1998

[51] Int. Cl.$^7$ ............................ A47G 1/17; A47G 29/087
[52] U.S. Cl. .................... 428/343; 428/40.1; 248/205.3; 248/467; 248/683
[58] Field of Search .................................. 428/343, 40.1; 248/205.3, 467, 683

[56] References Cited

U.S. PATENT DOCUMENTS

| | | | |
|---|---|---|---|
| 5,409,189 | 4/1995 | Lühmann | 248/205 |
| 5,507,464 | 4/1996 | Hamerski et al. | 248/683 |
| 5,516,581 | 5/1996 | Kreckel et al. | 428/317 |
| 5,672,402 | 9/1997 | Kreckel et al. | 428/343 X |
| 5,928,747 | 7/1999 | Lühmann et al. | |
| 5,984,247 | 11/1999 | Lühmann et al. | |
| 6,001,471 | 12/1999 | Bries et al. | 428/343 |

FOREIGN PATENT DOCUMENTS

| | | |
|---|---|---|
| 0 832 587 A2 | 4/1998 | European Pat. Off. |
| 33 31 016 A1 | 10/1984 | Germany |
| 197 29 706 A1 | 3/1998 | Germany |
| 196 37 223 A1 | 4/1998 | Germany |

*Primary Examiner*—Daniel Zirker
*Attorney, Agent, or Firm*—David B. Patchett

[57] ABSTRACT

An adhesive article adapted for removable mounting on a support surface includes a stretch release adhesive tape strip and a base member. The adhesive article includes an abutment adapted to engage the support surface when the article is pressed against the support surface, and thereby prevents the base member from rebonding to the adhesive strip. The abutment thereby allows the article to be pressed against the support surface during removal to hold the article in place without interfering with the removal process. The abutment can be projections protruding from the base member on opposite sides of the adhesive strip, a pair of side walls extending longitudinally along the adhesive strip, a flexible abutment tab extending from the base member which can be manually pressed against the support surface, a projection arranged adjacent the adhesive strip which engages the support surface and acts as a fulcrum when the user applies pressure to a particular location of the base member, or a portion of an article support member which is slidably connected with the base member.

24 Claims, 7 Drawing Sheets

STRETCH RELEASE ADHESIVE ARTICLE WITH ENHANCED REMOVAL FEATURE

FIELD OF THE INVENTION

The present invention relates generally to adhesive articles having a stretch release adhesive tape strip for removably bonding the article to a surface and, more particularly, to such an adhesive article including a removal enhancement feature which allows a user to press the article against the surface to maintain the article in place during removal without interfering with the removal process.

BACKGROUND OF THE INVENTION

Adhesive tapes which can be cleanly removed from a surface by stretching the tape are known in the prior art. The U.S. patent to Kreckel et al. U.S. Pat. No. 5,516,581, for example, discloses a removable adhesive tape strip including a highly extensible and substantially inelastic backing and a layer of pressure sensitive adhesive. When applied to a support surface, the adhesive tape strip becomes firmly bonded thereto, but can be easily removed without damaging the support surface by simply stretching the tape.

Stretch release adhesive tape strips have been used in a wide variety of applications including removably mounting a support or fixing device, such as a hook or hanger, on a wall. Conventional techniques for mounting a hook on a wall include driving a fastener, such as a nail or screw, into the wall, therefore creating a hole or otherwise damaging the wall. Stretch release adhesives tapes, in contrast, allow an item to be mounted on and removed from a wall without damaging the wall. Stretch release adhesive tape strips offer the additional advantage of working on a wide variety of wall surfaces including sheet rock, tile, and concrete, which are not well suited for conventional mounting techniques.

The U.S. patent to Hamerski et al. U.S. Pat. No. 5,507,464 discloses an article support which is adhered to a support surface using a double-sided stretch releasing adhesive. The article includes a base member, a double sided stretch release adhesive tape strip adhered to the base member, and a mechanism for gripping the stretch release adhesive tape strip. The base member and adhesive tape strip are arranged so that when the base member is adhered to the support surface by the tape, the base member can be removed by pulling on the gripping means. The U.S. patent to Luhmann, U.S. Pat. No. 5,409,189, discloses a double-sided, redetachable, self-adhesive hook including a strip of adhesive film which re-separably bonds the hook to a support surface. The adhesive power of the film largely disappears on extension of the film which is accomplished by pulling on the adhesive film. While such articles generally function satisfactorily, removal of double-sided adhesive tape strip articles can present certain difficulties. For example, where a double-sided stretch release adhesive tape strip is used to adhere an object, such as a plastic hook, to a wall, the release of the adhesive tape strip from both the object and the wall at the same time may cause the adhesive tape strip to snap-back in the direction of the stretching, in a manner similar to the snapping effect of a stretched rubber band, or may cause the object to be catapulted, particularly if the object is not held in place during removal.

Co-pending U.S. patent application Ser. No. 08/940,555, which is assigned to the same assignee as the present invention, discloses an improvement to double-sided stretchable adhesive tape strips which minimizes the problems of snap-back and catapulting by controlling the timing of the de-bonding from both the object and the support surface so that one adhesive surface releases before the other. More particularly, the adhesive tape strip includes a low adhesion portion on one surface and a greater adhesion portion on the surface opposite the low adhesion portion, whereby during removal the greater adhesion portion remains more aggressively adhered to either the support surface or the object, and the low adhesion portion completely releases from its associated surface. The low adhesion portion may be, for example, a release strip which completely de-bonds from its adhered surface prior to the complete de-bonding of the other side. Although sequentially controlling the release of the adhesive surfaces minimizes the problems of snap-back and catapulting, it does not entirely eliminate these problems. In addition, the advantages of sequential release are defeated if rebonding occurs. Rebonding occurs when the stretched adhesive tape strip re-attaches to the object or the support surface during removal and is described more fully with reference to FIGS. 1–4.

Figure 1:
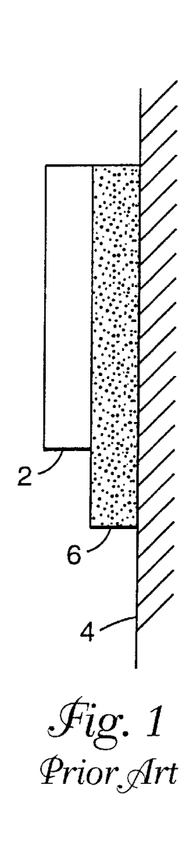
FIGS. 1 through 4 are side views of an adhesive article according to the prior art.
Figure 2:
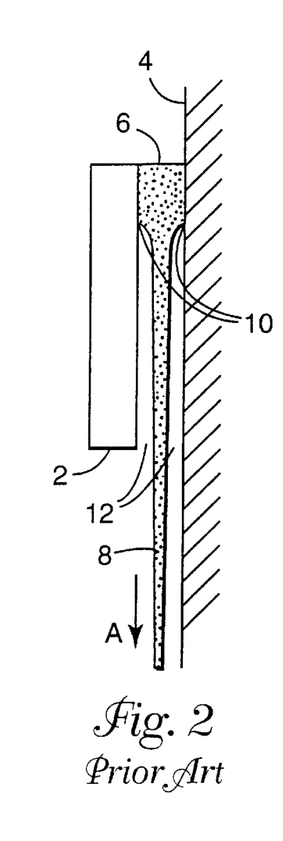

FIGS. 1–4 show an object 2 mounted on a support surface 4, such as a wall, using a stretch release adhesive tape strip 6. In FIG. 2, arrow A depicts the force applied by a user to stretch the adhesive tape strip 6, thereby to separate the object 2 from the support surface 4. As the adhesive tape strip 6 is stretched 8, its cross sectional area is reduced, (i.e. it necks down), and undergoes interfacial de-bonding 10 from both the object 2 and the support surface 4. As a result of the necking down, an open space 12 is created between the stretched adhesive tape strip 8 and both the object 2 and the support surface 4, and the adhesive tape strip 6 therefore no longer provides support for the object 2. When removed as intended, interfacial de-bonding progresses until the adhesive tape strip 6 is completely removed from the object 2 or the support surface 4, and the object 2 is therefore separated from the support surface 4.

Figure 3:
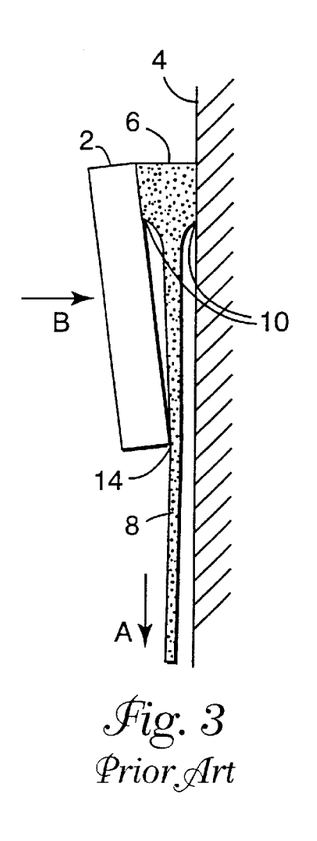
Figure 4:
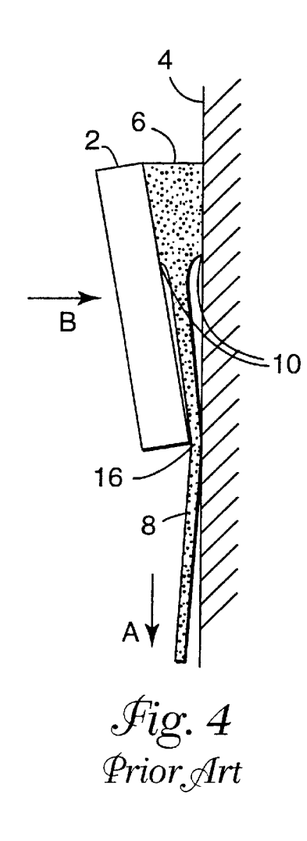

As illustrated in FIG. 3, however, users have a tendency to apply a force B to the object 2 during removal. This causes the object 2 to contact the stretched portion 8 of the adhesive tape strip 6 and re-adhere to the stretched tape at 14. Since the tape has already been stretched, the object cannot be released by further stretching the tape. Users, however have a tendency to increase the stretch force A to the point were the adhesive tape strip breaks. Once this occurs, the object 2 must be removed from the wall 4 by either prying or violently twisting the object from the wall, often causing damage to the wall surface and/or leaving adhesive residue on the wall. Moreover, if rebonding occurs near the end of the removal sequence, that is, after most of the adhesive tape strip has been de-bonded from the object and support surface, catapulting may occur as the user continues to exert the pulling force A on the tape. If the user continues to apply force B to the object, the stretched portion 8 of the tape strip will become pinched between the object and the support surface as shown in FIG. 4 at 16. As in the case of rebonding, once the tape strip becomes pinched, users have a tendency to increase the stretch force A to the point where the adhesive tape strip breaks so that the object must pried or twisted from the wall. By eliminating rebonding and pinching, the present invention eliminates these drawbacks.

SUMMARY OF THE INVENTION

The present invention provides an article, such as a hook or hanger, which is adapted to be adhesively mounted on a support surface, such as a wall. The article includes a base member and a stretch release adhesive tape strip arranged between the base member and the support surface. The base member includes a generally planar bottom surface which is adhered to one surface of the adhesive strip, and may further include a hook or hanger portion opposite the planar bottom surface. In accordance with a characterizing feature of the invention, the base member includes abutment means which engage the support surface when the base member is urged toward the support surface, thereby preventing the base member from pinching or rebonding with the adhesive strip or otherwise interfering with the removal process. The adhesive strip may include a tab portion which extends beyond an end portion of the base member which is grasped and pulled by a user to stretch the adhesive strip, thereby facilitating the stretching operation.

In each embodiment of the invention, the adhesive article includes an abutment means adapted to engage the support surface when the article is pressed against the support surface. The abutment means therefore allows a user to press the article against the support surface to hold the article in place when the article is being removed from the support surface without causing rebonding or pinching. In this way, the present invention eliminates the problems of snap-back and catapulting.

In one embodiment, the abutment means include a pair of spaced projections arranged on the base member bottom surface adjacent the adhesive strip tab portion and on opposite sides of the adhesive strip. The projections protrude from the base member a distance that is less than the original or unstretched thickness of the adhesive strip and greater than the stretched thickness of the adhesive strip, such as fifty percent of the unstretched thickness of the adhesive strip. In another embodiment, the abutment means include a pair of spaced side walls which extend longitudinally along the base member bottom surface on opposite sides of the adhesive strip.

In another embodiment, the base member includes an abutment portion which can be urged into contact with the support surface. The abutment portion can extend from the end of the base member remote from the adhesive strip tab portion or from the sides of the base member. To aid the user in applying pressure to a specific location on the abutment portion, a visual indicator can be provided thereon. In addition, the abutment portion may be flexible so that it bends into contact with the support surface, or may be connected with the base member with a hinge which allows the abutment portion to be stowed during non-use and then pivoted into contact with the support surface during the removal process. The base member may also be provided with a projection arranged between the abutment portion and the adhesive strip. Thus, as the user applies pressure to the abutment portion, the projection serves as a fulcrum, thereby creating a cantilevering affect which urges the opposite portion of the base member away from the support surface. In this way, the projection limits the degree to which the adhesive strip is compressed and reduces the amount of force required to stretch the adhesive strip.

In another embodiment, the adhesive article includes an article support member, such as a hook member, which is slidably connected with the base member. The hook member is movable between a mounted position in which the base member and adhesive strip are concealed behind the hook member. During the removal process, the hook member is displaced relative to the base member so that the hook member extends beyond the base member and the tab portion of the adhesive strip is exposed. After the base member is displaced, the abutment portion can be urged into engagement with the support surface to hold the hook member in place and the adhesive strip can be stretched to effect removal.

BRIEF DESCRIPTION OF THE DRAWING

The present invention will be further described with reference to the accompanying drawings, in which.

DETAILED DESCRIPTION

Figure 5:
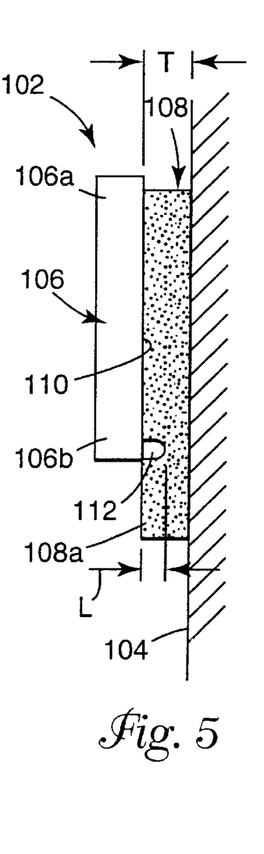
FIG. 5 is a side view of an adhesive article according to the invention in its mounted condition.
Figure 6:
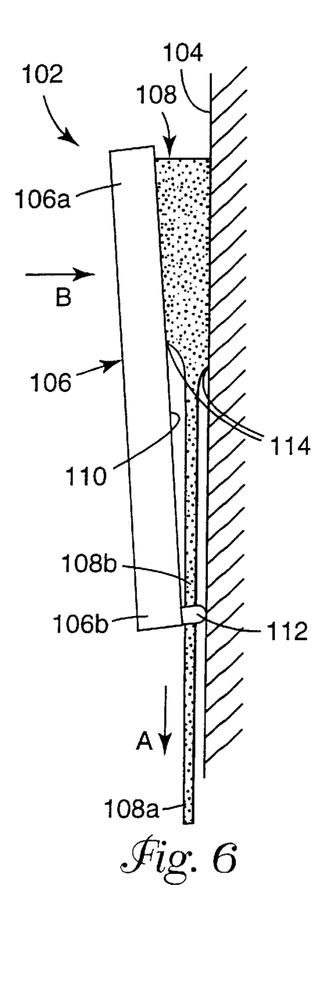
FIG. 6 is a side view of the adhesive article of FIG. 5 being removed from a support surface.
Figure 7:
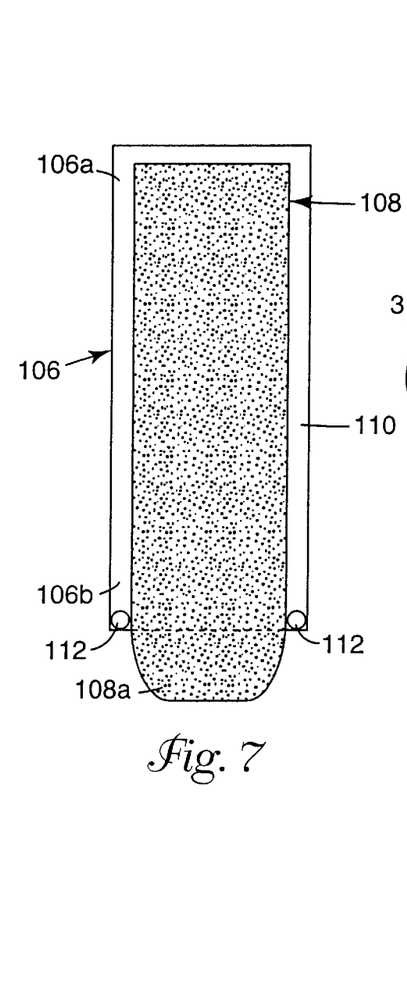
FIG. 7 is a bottom view of the adhesive article of FIG. 5.

Referring now to FIGS. 5–7, there is shown an adhesive article 102 mounted on a support surface 104, such as a wall. The adhesive article 102 includes a base member 106 and a stretch release adhesive tape strip 108 arranged between and adhesively bonded to the base member 106 and the support surface 104. The base member 106 has first and second end portions 106a, 106b, respectively, and a bottom surface 110. The adhesive strip 108 extends substantially along the bottom surface 110 of both the first and second end portions 106a, 106b. A suitable adhesive strip is described in co-pending U.S. patent application Ser. No. 08/308,937 which is assigned to the same assignee as the present invention and is hereby incorporated by reference. The adhesive strip described in German Patent DE 33 31 016 can also be used. The adhesive article 102 can further include an article support (not shown), such as a hook or hanger, arranged opposite the bottom surface 110 for supporting an item on the support surface. Such an article support can be formed integrally with the base member or provided as a separate component which is attached to the base member. In accordance with a characterizing feature of the invention, the base member 106 includes abutment means 112 in the form of a pair of spaced projections or spacers extending a distance L from the base member second end portion 106*b* bottom surface 110 on opposite sides of the adhesive strip 108.

When in use, the adhesive article 102 is mounted on the support surface as shown in FIG. 5. In this mounted condition, the adhesive strip 108 has an unstretched generally uniform thickness T which is greater than the length L of the projections 112. Thus, the projections are spaced from the support surface 104. This spacing allows the article to be pressed firmly against the support surface 104 and allows the adhesive strip 108 to compress when the article is initially secured to support surface 104. Accordingly, the adhesive strip 108 can conform to the contours or texture of the support surface 104 and form an effective bond with the support surface.

When the adhesive article is being removed from the support surface 104 as shown in FIG. 6, the user pulls on the tab portion 108*a* of the adhesive strip 108, thereby imparting a force A sufficient to stretch the strip. The force A causes the strip to progressively stretch and undergo interfacial de-bonding 114 from both the base member 106 and the support surface 104. As the adhesive strip stretches, it is elongated and its cross-sectional area is reduced. During removal, however, users have a tendency to press the base member 106 against the support surface 104 as represented by arrow B to hold the article in place. Rather than maintaining the article in place as intended, however, pressing the base member toward the support surface 104 can interfere with the removal process as described in reference to FIGS. 1–4 by pinching the adhesive strip 108 between the base member 106 and support surface 104, or causing the base member 106 to rebond with the adhesive strip 108. With the present invention, on the other hand, the projections 112 contact the support surface 104 before the base member bottom surface 110 contacts the adhesive strip 108 and pinching and rebonding are therefore avoided. Thus, the user can press the base member 106 against the support surface 104 to hold it in place without interfering with the removal process.

The cross-sectional area of the stretched portion 108*b* of a typical polymeric foam stretch release adhesive tape strip will generally be reduced by at least 50 percent. Thus, the thickness of the stretched portion 108*b* of the adhesive strip will be less than 50 percent of the original or unstretched thickness T. To ensure that the projections 112 engage the support surface 104 before the base member 106 contacts the adhesive strip 108, the length of the projections is greater than the stretched thickness of the adhesive strip. Depending on the adhesive strip used, the length L of the projections 112 can range from 10 to 80 percent of the unstretched thickness T of the adhesive strip 108. Projections having a length in this range provide adequate space for the adhesive strip 108 to be compressed when the article is initially secured to the support surface 104 without having the projections 112 contact the support surface 104, but allow the projections 112 to engage the support surface 104 when the base member 106 is pressed against the support surface 104 during removal, therefore preventing the base member 106 from pinching or re-adhering to the adhesive strip 108.

Figure 8:
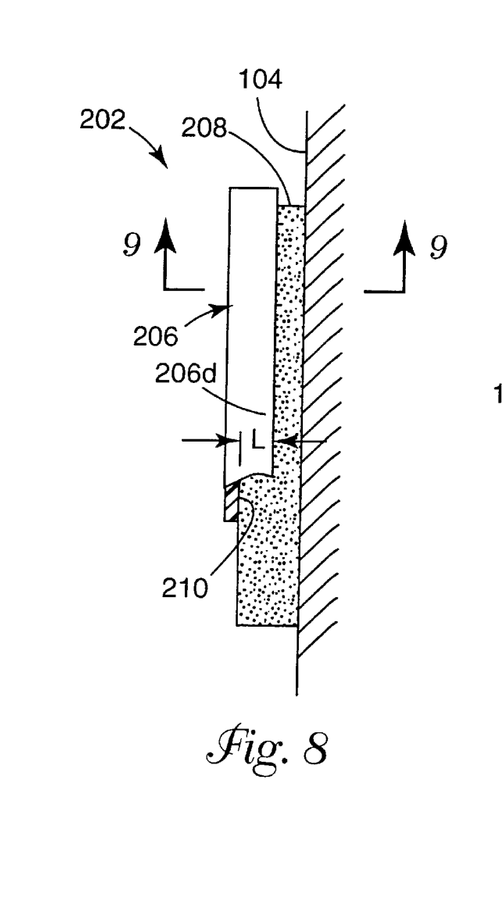
FIG. 8 is a partial cut away side view of a second embodiment of the invention in its mounted condition.
Figure 9:
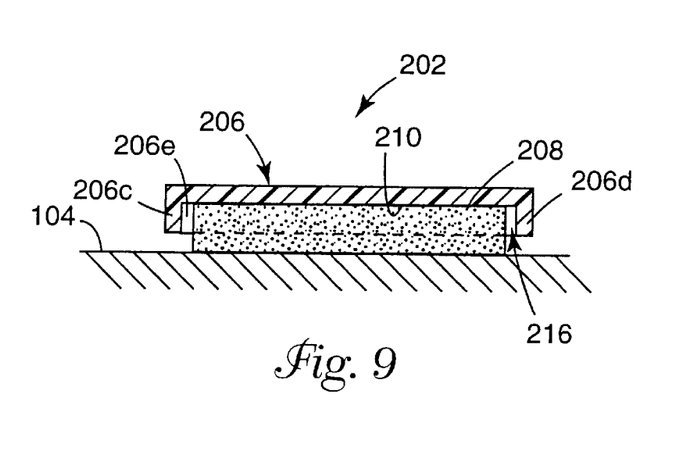
FIG. 9 is a cross-sectional view taken along line 9—9 of FIG. 8.
Figure 10:
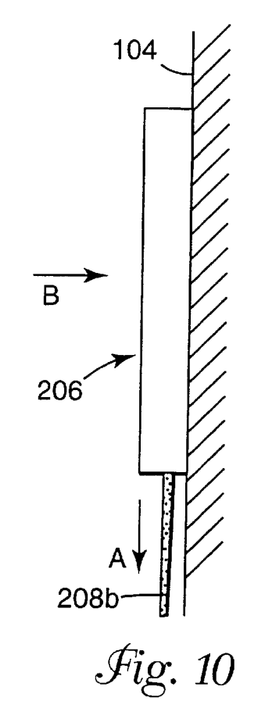
FIG. 10 is a side view of the adhesive article of FIG. 8 being removed from a support surface.

FIGS. 8–10 show a second embodiment of the invention. The adhesive article 202 includes a base member 206 having a pair of spaced longitudinally extending side wall portions 206*c*, 206*d*, and a transverse end wall portion 206*e* (FIG. 9). The side walls 206*c*, 206*d*, and end wall 206*e* define a longitudinally extending channel 216 which receives the stretch release adhesive tape strip 208 which, in turn, serves to adhesively bond the base member 206 to the support surface 104. The side walls 206*c*, 206*d* extend toward the support surface 104 a distance L. As with the projections 112 in FIGS. 5–7, the length L is less than the unstretched thickness of the adhesive strip 208, but greater than the stretched thickness of the adhesive strip 208*b*. In this way, when the adhesive article 202 is initially mounted on the support surface 104 by firmly pressing the adhesive article against the support surface, the adhesive strip 208 can compress somewhat without having the side walls 206*c*, 206*d* contact the support surface. This allows an effective bond to be formed between the adhesive strip 208 and the support surface 104. In addition, as shown in FIG. 10, the side walls 206*c*, 206*d* allow a user to press the adhesive article 202 against the support surface to hold the base member 206 in place during the removal process without having the base member rebond with or pinch the stretched portion 208*b* of the adhesive strip 208. The force B applied by the user can be directed at any point along the length of the base member without causing rebonding or pinching. In addition, the end wall 206*e* serves as a guide which allows the user to align the adhesive strip 208 along the bottom surface 210 of the base member when applying the adhesive strip to the base member.

Figure 11:
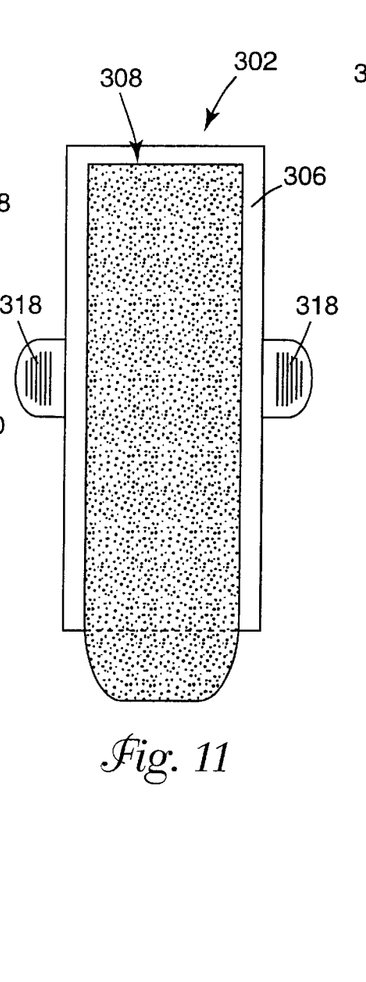
FIG. 11 is a bottom view of a third embodiment of the invention.
Figure 12:
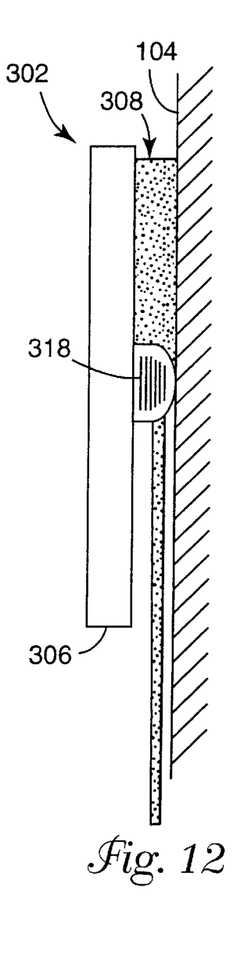
FIG. 12 is a side view of the adhesive article of FIG. 11 being removed from a support surface.

FIGS. 11 and 12 show an adhesive article 302 having flexible abutment tabs 318 extending from each side of the base member 306. The abutment tabs 318 can be located at any point along either side of the base member. To remove the adhesive article, the user first presses the abutment tabs 3 18 until they contact the support surface 104 as shown in FIG. 12, and then stretches the adhesive strip 308 as described previously. Thus, the abutment tabs 318 serve to hold the base member 306 in place, therefore preventing snap-back and catapulting, without causing rebonding or pinching.

Figure 13:
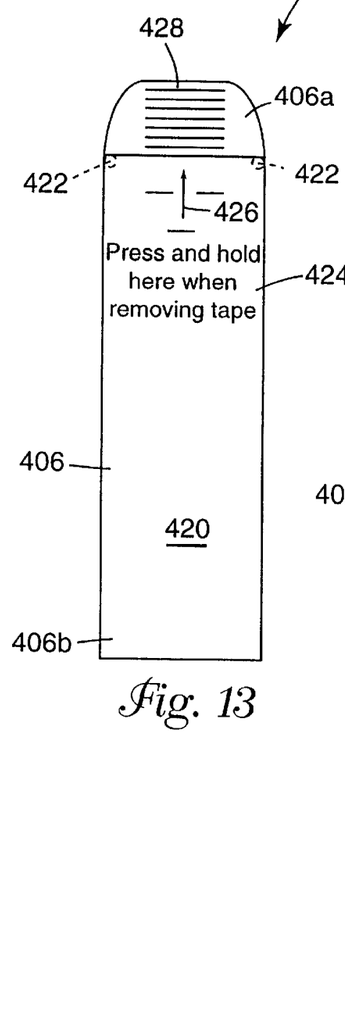
FIG. 13 is a top view of a fourth embodiment of the invention.
Figures 14, 15:
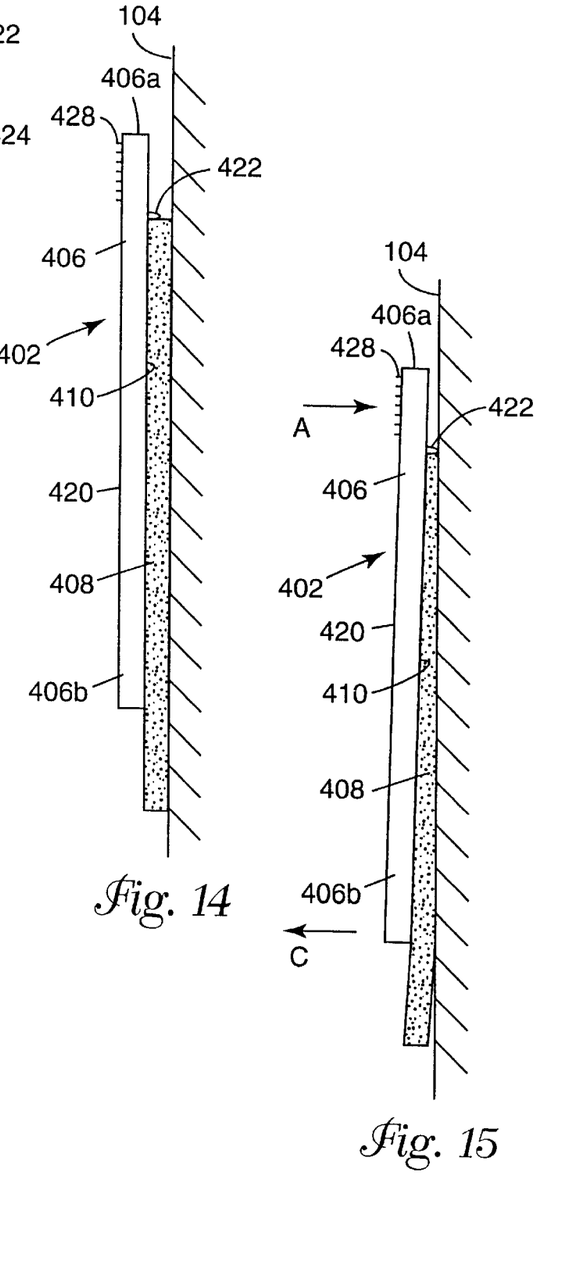
FIG. 14 is a side view of the adhesive article of FIG. 13 in its mounted condition.
FIG. 15 is a side view of the adhesive article of FIG. 13 pressed against a support surface.

FIGS. 13–15 show an adhesive article 402 including a base member 406 and a stretch release adhesive strip 408. The base member 406 has a first end portion 406*a* which extends beyond the end of the adhesive strip 408, a second end portion 406*b*, and top and bottom surfaces 420, 410, respectively. A pair of abutment projections 422 extend from the bottom surface 410 of the base member 406 intermediate the first 406*a* and second 406*b* end portions adjacent the adhesive strip 408. Alternatively, the base member 406 can be provided with a single continuous transverse projection extending the width of the base member adjacent the adhesive strip 408. Written instructions 424 and an indicating arrow 426 are provided on the top surface 420 of the base member 406 instructing the user to press an ergonomic target 428 provided on the top surface 420 of the first end portion 406*a* during removal of the article from the support surface. The adhesive strip 408 extends from adjacent the projections 422 along the bottom surface 410 of the second end portion 406*b*.

FIG. 15 shows the article during the removal process. During removal, a user manually applies a force to the target as depicted by arrow A to hold the article in place. The force A causes the adhesive strip 408 proximate the projections 422 to compress until the projections engage the support surface 104. Since the compressed portion of the adhesive strip has not been stretched, it will stretch and release from the base member 406 and support surface 104 when pulled. Thus, the compression of the adhesive strip does not interfere with the de-bonding process. Once the projections 422 engage the support surface 104, the projections 422 become a fulcrum and serve as a pivot point, whereby additional pressing force applied by the user causes the base member second end portion 406*b* to pivot away from the support surface 104 as depicted by arrow C. Accordingly, rebonding and pinching are prevented. The pivoting action also reduces the force required to stretch the adhesive strip 408 and thereby serves to facilitate removal. In addition, the force A creates a frictional force between the projections 422 and the support surface 104 which serves to hold the base member 406 in place as the adhesive strip 408 is stretched from between the base member 406 and the support surface 104. To prevent catapulting, the force applied to the target 428 must create a frictional force between the projections 422 and the support surface 104 which is greater than the shear force created by the stretching of the adhesive strip. Moderate finger pressure has been found to be sufficient to accomplish this.

Figures 16, 17:
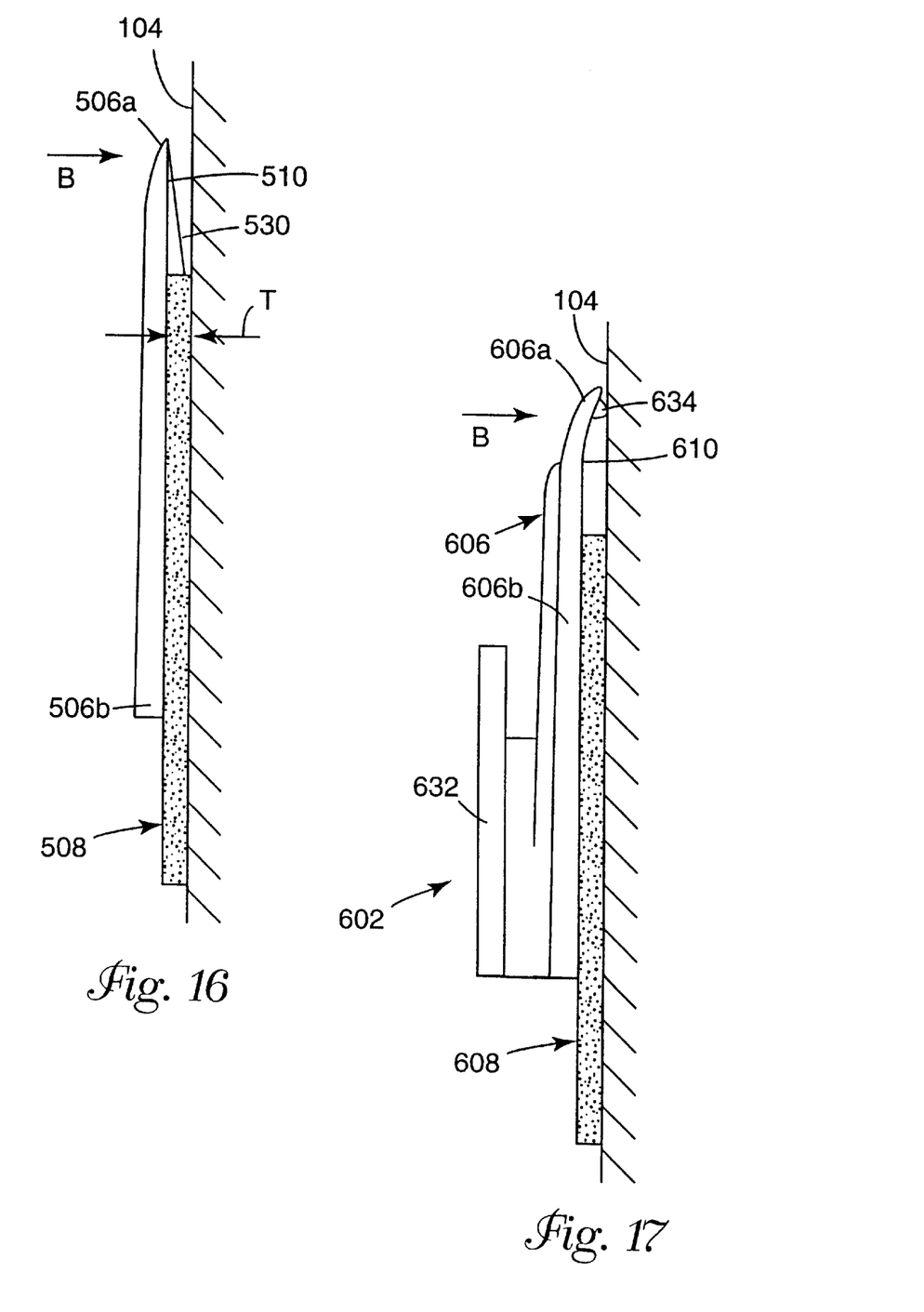
FIG. 16 is a side view of a fifth embodiment of the invention.
FIG. 17 is a side view of a sixth embodiment of the invention.

The adhesive article of FIG. 16 is similar to that of FIGS. 13–15 except that the projections 422 of FIGS. 13–15 have been replaced with an angled fulcrum 530 which extends along the bottom surface 510 of the abutment portion 506a. The angled fulcrum 530 has its thickest portion adjacent the adhesive strip 508 and tapers becoming progressively thinner toward the abutment portion 506a terminal end. To allow the adhesive strip 508 to be compressed when it is initially secured to the support surface, the thickness of the thickest portion of the angled fulcrum 530 is less than the unstretched thickness T of the adhesive strip 508. To provide adequate stability, the angled fulcrum 530 can be formed either as one continuous portion which extends the entire width of the abutment portion 506a or as several spaced or discrete portions. When a force B is applied to the abutment portion 506a, the base member second end portion 506b will pivot away from the support surface 104 as described previously with reference to FIG. 15. In addition, however, the angled fulcrum 530 establishes the proper removal angle which is typically 30 degrees or less.

FIG. 17 shows an adhesive article 602 including a hook or hanger 632 attached to the base member 606. The base member 606 includes a flexible abutment portion 606a having a projection 634 at its terminal end which is adapted to engage the support surface 104. Alternatively, the bottom surface 610 of the abutment portion 606a can be provided with a frictional or adhesive surface instead of the projection 634 to engage the support surface 104 directly and therefore hold the adhesive article in place during removal. As with the adhesive articles of FIGS. 13–16, the adhesive strip 608 extends only along the second end portion 606b of the base member 606, thereby leaving the first end abutment portion 606a unsupported. Thus, when a force B is applied to the abutment portion 606a, the abutment portion 606a will bend until the projection 634 contacts with the support surface 104, thereby holding the article in place when the adhesive strip 608 is stretched during the removal process. In addition, the adhesive strip 608 will be compressed in the region adjacent the abutment portion 606a, and will therefore act as a fulcrum causing the second end portion 606b of the base member to pivot away from the support surface as described previously with reference to FIG. 15.

Figure 18:
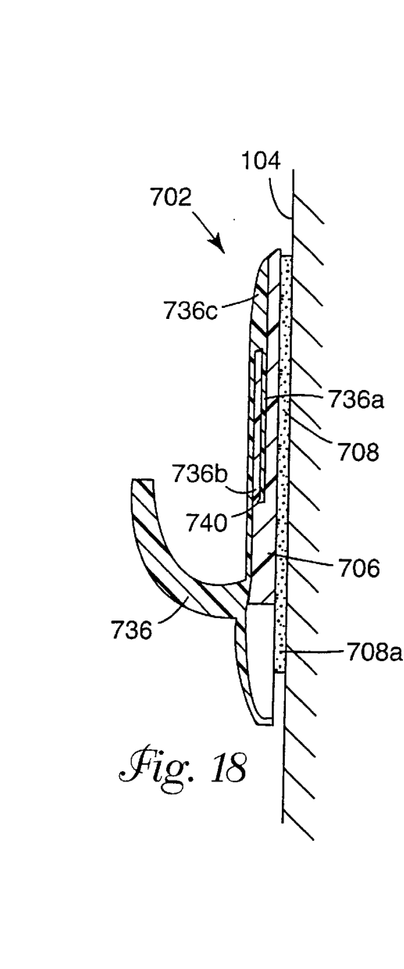
FIGS. 18 and 19 are cross-sectional side views of a seventh embodiment of the invention.
Figure 19:
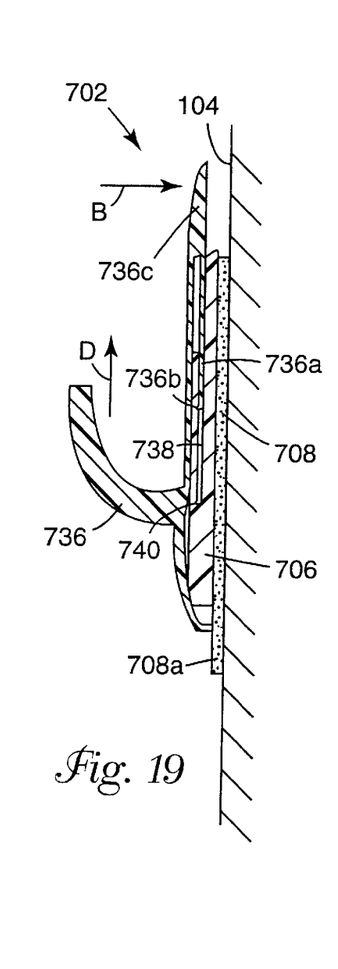

FIGS. 18 and 19 show an adhesive article 702 including a base member 706, an article support in the form of a hook member 736 slidably connected with the base member 706, and an adhesive strip 708 arranged between and adhesively bonded to the base member 706 and the support surface 104. The base member 706 contains a guide channel 738 which slidably receives a slide portion 736a of the hook member. In the mounted condition shown in FIG. 18, the slide portion 736a is arranged within the guide channel 738 so that a projection 736b on the slide portion engages a notch 740 contained in the guide channel 738, thereby locking the base member 706 and hook member 736 together. In the mounted condition, the hook member 736 is position so as to overlap or cover the base member 706 and adhesive strip 708, whereby both the base member and adhesive strip are hidden from view. As shown in FIG. 19, the adhesive article is removed by sliding the hook member 736 relative to the base member 706, as depicted by arrow D, to a displaced position. In the displaced position, an abutment portion 736c of the hook member 736 extends beyond the base member 706 and the tab portion 708a of the adhesive strip is exposed. The user can then manually urge the abutment portion 736c into engagement with the support surface 104 as indicated by arrow B to hold the adhesive article in place, and pull on the tab 708a to release the base member 706 from the support surface 104.

Figure 20:
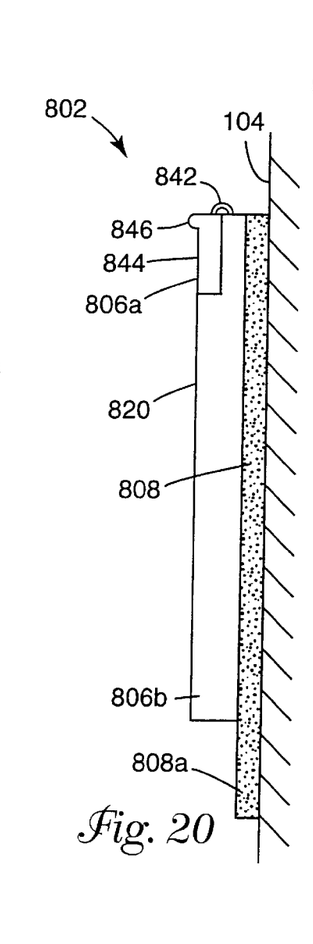
FIG. 20 is a side view of an eighth embodiment of the invention in its folded condition.
Figure 21:
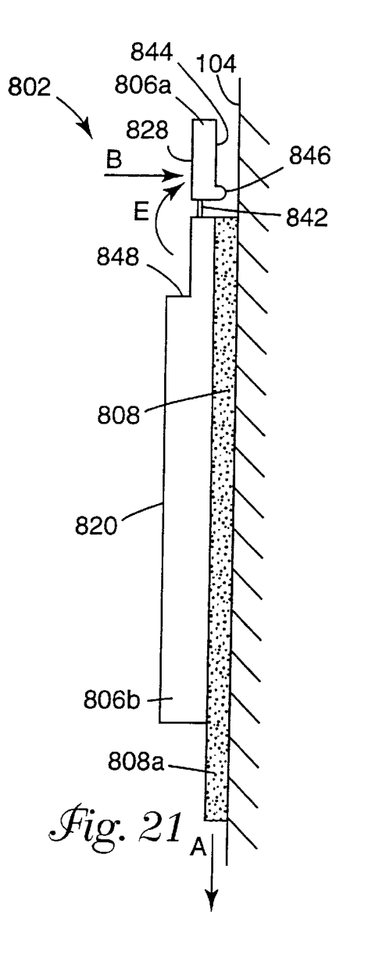
FIG. 21 is side view of the adhesive article of FIG. 20 in its unfolded condition.

FIGS. 20 and 21 show an adhesive article 802 having a first end portion or abutment portion 806a which is pivotally connected with a second end portion 806b. A hinge 842, which may be a living hinge or other conventional mechanical hinge, forms the pivotable connection between the abutment portion 806a and the second end portion 806b. The abutment portion 806a includes a target surface 828 which can include a target similar to the target 428 shown in FIG. 13, and further includes an abutment surface 844 opposite the target surface 828 which includes a projection 846 extending therefrom. The second end portion 806b contains a recess 848 adapted to receive the abutment portion 806a. The abutment portion 806a is movable between a folded or stowed position shown in FIG. 20 and an unfolded or extended position shown in FIG. 21. In the folded position, the abutment portion 806a is contained with the recess 848 so that abutment surface 844 is generally aligned with the second end portion 806b top surface 820. In the unfolded position, the abutment portion 806a is rotated generally 180 degrees, whereby the abutment surface 844 faces the support surface 104. To remove the adhesive article from the support surface 104, the abutment portion 806a is first unfolded as indicated by arrow E. The user then applies a force B to the target surface 828, thereby urging the projection 846 into engagement with the support surface 104, and further causing the remote end of second end portion 806b to pivot away from the support surface 104. The user then stretches the adhesive strip 808 by pulling on the tab portion 808a of the strip as indicated by arrow A.

Figure 22:
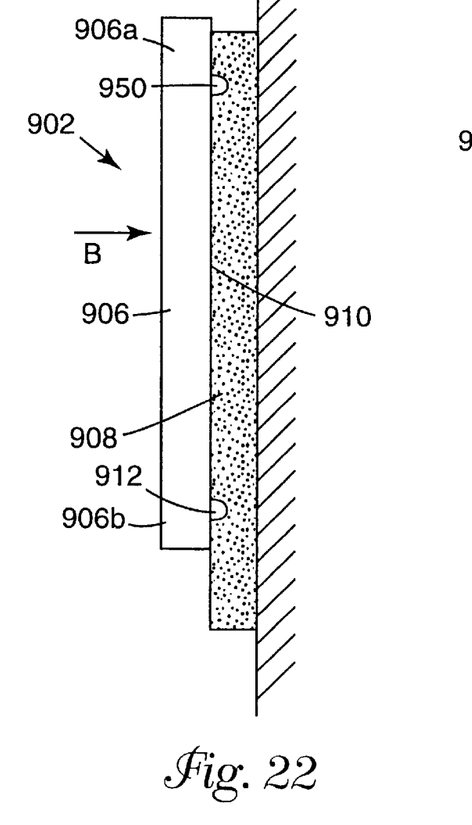
FIGS. 22 and 23 are side and bottom views, respectively, of an ninth embodiment of the invention.
Figure 23:
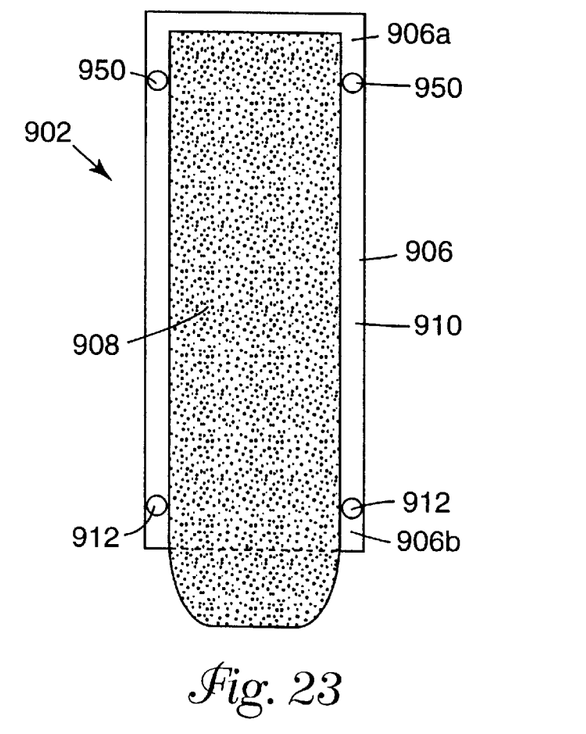

FIGS. 22 and 23 show an adhesive article 902 similar to the article 102 described in reference to FIGS. 5–7 except that the adhesive article 902 of FIGS. 22 and 23 includes a pair of rearward projections 950 extending from the bottom surface 910 of the base member first end portion 906a on opposite sides of the adhesive strip 908. The rearward projections 950 in combination with the forward projections 912 allow a user to apply pressure at any point along the length of the base member 906 to hold the adhesive article in place during removal without interfering with the removal process. For example, if the user applies a force to the second end portion 906b of the base member, the forward projections 912 will engage the support surface 104 and will prevent rebonding and pinching in the same manner as the projections 112 described in reference to FIGS. 5–7. If the user applies a force B to the base member 906 at a point intermediate the forward 912 and rearward 950 projections, both pairs of projections will be urged into engagement with the support surface 104, thereby preventing the base member 906 from pinching or re-adhering to the adhesive strip 908. If the user applies a force B to the base member first end portion 906a, the rearward projections 950 will be urged into engagement with the support surface 104, thereby holding the adhesive article 902 in place during the removal process. In addition, once the rearward projections 950 engage the support surface 104, the projections 950 will serve as a pivot point in the same manner as the projections 422 described in reference to FIGS. 13–15.

It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. An adhesive article adapted to be removably affixed to a support surface, comprising:
    (a) a base member having first and second end portions, each said first and second end portion having a bottom surface; and
    (b) a stretch release adhesive strip arranged between said base member bottom surface and the support surface; and further comprising abutment means adapted to engage the support surface when said abutment means is urged in the direction of the support surface.

2. An adhesive article as defined in claim 1, wherein said adhesive strip extends along a portion of each of said base member first and second end portion bottom surfaces, and wherein said adhesive strip includes a tab portion extending beyond said base member second end portion, thereby allowing a user to manually grasp and pull said tab portion to stretch said adhesive strip.

3. An adhesive article as defined in claim 2, wherein said adhesive strip has a thickness and said abutment means include at least one projection extending from said base member second end portion bottom surface, said projection projecting a distance less than said adhesive strip thickness, whereby when said base member is urged toward the support surface, said adhesive strip is compressed and said projection engages the support surface.

4. An adhesive article as defined in claim 3, wherein said projection projects a distance equal to generally greater than 40 percent of the adhesive strip thickness.

5. An adhesive article as defined in claim 4, wherein said abutment means include a pair of spaced projections extending from said base member second end portion bottom surface adjacent opposite sides of said adhesive strip.

6. An adhesive article as defined in claim 2, wherein said abutment means include a pair of spaced longitudinally extending walls.

7. An adhesive article as defined in claim 1, wherein said first end portion is pivotally connected with said second end portion, said first end portion being movable between a folded position wherein said first end portion is arranged adjacent said second end portion, and an unfolded position wherein said first end portion extends outwardly from said second end portion.

8. An adhesive article as defined in claim 7, wherein said first end portion is connected with said second end portion with a hinge, and further wherein said first end portion includes a projection adapted to engage the support surface when a force directed toward the support surface is applied to said first end portion.

9. An adhesive article as defined in claim 1, wherein said abutment means include at least one flexible abutment tab adapted to be urged into contact with the support surface.

10. An adhesive article as defined in claim 1, wherein said adhesive strip extends only along said second end portion bottom surface.

11. An adhesive article as defined in claim 10, and wherein said abutment means include a projection projecting from said first end portion bottom surface adjacent said adhesive strip, whereby when a force is applied to said base member first end portion outer surface, said projection serves as a fulcrum, thereby causing said first end portion to pivot in the direction of the support surface and causing said second end portion to pivot away from the support surface.

12. An adhesive article as defined in claim 11, wherein said projection is tapered having a wide end adjacent said adhesive strip.

13. An adhesive article as defined in claim 10, wherein said first end portion is formed of a flexible material, such that when a force is applied to said first end portion outer surface, said first end portion bends into engagement with the support surface and said second end portion is urged away from the support surface.

14. An adhesive article as defined in claim 1, and further comprising an article support member slidably connected with said base member, said article support member being movable relative to said base member between a mounted position wherein said article support member overlaps said base member and said adhesive strip, and a displaced position wherein said adhesive strip tab portion is exposed, and further wherein said article support includes an abutment portion extending beyond said base member, whereby said abutment portion can be manually urged into contact with the support surface.

15. An adhesive article adapted to be removably affixed to a support surface, comprising:
    (a) a base member having first and second end portions, each said first and second end portion having a bottom surface; and
    (b) a stretch release adhesive strip arranged between said base member bottom surface and the support surface; and further comprising an abutment arranged to engage the support surface when said base member is urged in the direction of the support surface.

16. An adhesive article as defined in claim 15, wherein said adhesive strip has a thickness and said abutment comprises at least one projection extending from said base member second end portion bottom surface, said projection projecting a distance less than said adhesive strip thickness, whereby when said base member is urged toward the support surface, said adhesive strip is compressed and said projection engages the support surface.

17. An adhesive article as defined in claim 16, wherein said abutment includes a pair of spaced projections extending from said base member second end portion bottom surface adjacent opposite sides of said adhesive strip.

18. An adhesive article as defined in claim 15, wherein said abutment includes a pair of spaced longitudinally extending walls.

19. An adhesive article as defined in claim 15, wherein said first end portion is pivotally connected with said second end portion, said first end portion being movable between a folded position wherein said first end portion is arranged adjacent said second end portion, and an unfolded position wherein said first end portion extends outwardly from said second end portion.

20. An adhesive article as defined in claim 19, wherein said first end portion is connected with said second end portion with a hinge, and further wherein said abutment is arranged on said first end portion to engage the support surface when a force directed toward the support surface is applied to said first end portion.

21. An adhesive article as defined in claim 15, wherein said abutment includes at east one flexible abutment tab adapted to be urged into contact with the support surface.

22. An adhesive article as defined in claim 15, wherein said abutment includes a projection projecting from said first end portion bottom surface adjacent said adhesive strip, whereby when a force is applied to said base member first end portion outer surface, said projection serves as a fulcrum causing said first end portion to pivot in the direction of the support surface and causing said second end portion to pivot away from the support surface.

23. An adhesive article as defined in claim 22, wherein said projection is tapered, having a wide end adjacent said adhesive strip.

24. An adhesive article as defined in claim 15, and further comprising an article support member slidably connected with said base member, said article support member being movable relative to said base member between a mounted position wherein said article support member overlaps said base member and said adhesive strip, and a displaced position wherein said adhesive strip tab portion is exposed, and further wherein said article support includes an abutment portion extending beyond said base member, whereby said abutment portion can be manually urged into contact with the support surface.

* * * * *